United States Patent [19]

Eckardt et al.

[11] Patent Number: 5,656,215

[45] Date of Patent: Aug. 12, 1997

[54] PROCESS FOR INJECTION MOLDING OBJECTS HAVING AT LEAST TWO DIFFERENT LAYERS

[75] Inventors: Helmut Eckardt, Meinerzhagen; Hermann Plank, Langen; Harald Bleier, Wiener Neustadt, all of Germany

[73] Assignee: Battenfeld GmbH, Meinerzhagen, Germany

[21] Appl. No.: 425,109

[22] Filed: Apr. 20, 1995

[30] Foreign Application Priority Data

Apr. 23, 1994 [DE] Germany ............... 44 14 258.7

[51] Int. Cl.$^6$ ............................... B29C 45/16
[52] U.S. Cl. .................. 264/45.1; 264/241; 264/255; 264/328.7; 264/338; 264/572; 425/812
[58] Field of Search .................. 264/328.7, 572, 264/45.1, 338, 255, 46.6, 241; 425/812

[56] References Cited

U.S. PATENT DOCUMENTS

| 3,767,742 | 10/1973 | Robin | 264/328.7 |
|---|---|---|---|
| 3,809,733 | 5/1974 | Sandiford et al. | 264/328.7 |
| 3,825,637 | 7/1974 | Robin | 264/328.7 |
| 4,035,466 | 7/1977 | Langecker | 264/45.1 |
| 4,115,491 | 9/1978 | Hanning | 264/45.1 |
| 4,247,515 | 1/1981 | Olabisi | 264/45.1 |
| 4,282,285 | 8/1981 | Mohiuddin | 264/46.6 |
| 4,389,358 | 6/1983 | Hendry | 264/328.7 |
| 4,389,454 | 6/1983 | Horacek et al. | 264/255 |
| 4,497,763 | 2/1985 | Monnet | 264/255 |
| 5,093,053 | 3/1992 | Eckardt et al. | 264/572 |
| 5,093,054 | 3/1992 | Hirota | 264/45.1 |
| 5,116,557 | 5/1992 | Debaes et al. | 264/255 |
| 5,254,306 | 10/1993 | Inada et al. | 264/572 |
| 5,417,916 | 5/1995 | Ladney | 264/572 |

FOREIGN PATENT DOCUMENTS

| 1954478 | 6/1970 | Germany | 264/255 |
|---|---|---|---|
| 2353816 | 5/1974 | Germany | 264/255 |
| 2461925 | 11/1975 | Germany | 264/255 |
| 3642138A1 | 6/1988 | Germany | C08J 7/04 |
| 62-108019 | 5/1987 | Japan | 264/255 |
| WO9317855 | 9/1993 | WIPO | 264/255 |
| WO9323237 | 11/1993 | WIPO | 264/255 |

*Primary Examiner*—Allan R. Kuhns
*Attorney, Agent, or Firm*—Hamilton, Brook, Smith & Reynolds, P.C.

[57] ABSTRACT

A process for the injection molding of objects having an outer layer of enamel and an inter layer of a plastic material is disclosed. According to the process, a liquid enamel is used. This enamel is injected by an enamel-injection apparatus through an enamel-injection die. A plastic melt passes through an injection unit into the cavity. According to the invention, the liquid enamel is injected into the flow path of the melt in the region before the cavity, before the melt is injected, so that the melt is encased by enamel before it is distributed in the cavity. Variations are also disclosed. For example, the form can be filled with enamel and the excess enamel drained. Then, the melted plastic material is introduced into the injection molding form. Also, the form can filled and then the capacity of the form increased to accommodate the melted plastic material. In any case, it is possible to use liquid enamels to enamel injection molded parts in the tool or form. Furthermore, the inventive process makes possible a rapid and therefore economical mode of operation.

25 Claims, 7 Drawing Sheets

PROCESS FOR INJECTION MOLDING OBJECTS HAVING AT LEAST TWO DIFFERENT LAYERS

BACKGROUND OF THE INVENTION

The invention relates to a process for injection molding objects including at least two different layers. The outer layer is produced from a liquid enamel, which is injected by at least one enamel-injection apparatus through at least one enamel-injection die. A melted plastic material is introduced by an injection unit through a plastic-injection die into the cavity of an injection molding tool, also known as an injection molding form.

A similar process is disclosed in DE-OS 24 61 925. Enameled plastic molded bodies are produced by first injection molding the actual injection molded part of plastic material. Then, one side of the molded body is coated with enamel. For this purpose, the injection molding tool is opened by a certain amount, and liquid enamel is injected into the resulting cavity by an enamel-injection apparatus. By closing the tool, the enamel is distributed on this side of the molded body. The same procedure is repeated for the other side of the molded body.

Another process for producing enamel-coated injection molded parts is taught in DE 36 42 138 A1. Before the plastic material is introduced, the mold-forming surfaces of the injection molding tool or form are sprayed with enamel. Spray heads, integrated into the form, introduce the enamel before injection of the melt.

Finally, a similar process is known from the P 43 40 990, which is directed to a method for producing a plastic object of two different layers. The outer layer of the object is enamel, which is applied in a heated liquid state. The enamel is first placed, in the form of granulate, into a plasticising unit. Under the action of the kneading motion of an extruder screw and heat from heating elements, which are disposed about the extruder screw cylinder, the enamel granulate is plasticised and liquified. Through an injection molding die, it reaches the cavity of the injection molding form together with the plasticised plastic melt. An appropriately designed die here achieves the result that the enamel surrounds the plastic melt in the cavity of the injection molding form. It is also possible for one or more layers of enamel to be injected first into the cavity of the form, followed by the plastic in the liquid state. The molded parts thus receive a two- or multi-layered structure, such that the enamel layers completely surround the plastic material.

SUMMARY OF THE INVENTION

The disadvantage of the above-described technology is that only such enamels can be processed that behave like thermoplastics. The enamels in granulate form must be plasticisable during the process by means of a screw extruder. Another precondition is that the plasticised, i.e., liquified, enamels do not harden in the screw cylinder of the extruder under the high temperatures prevailing there.

The invention is based on the task of creating a process in which it is possible to process even enamels which do not behave like thermoplastics, and which therefore cannot be plasticized in the extruder screw units. By means of this inventive process, it should be possible to make plastic molded parts that are completely covered by the enamel layer, using even such enamels. Naturally, the fabrication of enamel-coated plastic molded bodies should be as economical as possible.

In the most basic form, the process involves injecting an enamel into the flow path of melted plastic material in the region before the actual cavity of an injection molding form at least partially before injection of the melted plastic material, in such a fashion that the subsequently injected melted plastic material is essentially encapsulated by enamel as it is distributed in the cavity of the injection molding form. Multi-step implementations of the process involve first filling the injection molding form with only the liquid enamel. Then, a predetermined volume of enamel is drained from the Cavity, and melted plastic material is introduced by an injection unit through a plastic-injection die to replace the drained portion of the enamel. Two variants are possible. After filling the injection molding form, the capacity of its cavity can be enlarged. A gas can be introduced into the space and the melted plastic material latter or the melted plastic material can be directly introduced.

In general, according to one aspect, the invention features a process for injection molding objects having at least two different layers with an injection molding device. This device includes an injection molding tool having a cavity serving as a form for the objects, at least one enamel-injection apparatus for injecting a liquid enamel into the cavity of the injection molding tool through at least one enamel-injection die, and a plastic injection unit for introducing a melted plastic material into the cavity through a plastic-injection die. The inventive process comprises first injecting the enamel into a flow path of the melted plastic material in a region upstream of the cavity of the injection molding tool. The melted plastic is subsequently injected into the region so that the melted plastic material is essentially encapsulated by enamel. Thus, the melted plastic is distributed in the cavity of the injection molding tool surrounded by the enamel.

In specific embodiments, the flow path in which the enamel is introduced is a runner or plastic injection die. Also, the enamel-injection apparatus can comprise a plunger injection unit or gear pump. Further, the process can include heating the enamel to a defined temperature prior to injection into the cavity. The enamel may be a multi-component type. Still further, the temperature of the injection molding tool may be increased by tempering elements to harden the enamel.

In general, according to another aspect, the process features a similar device as described above. But, as a preliminary step, the cavity of the injection molding tool is substantially filled with the liquid enamel, and then any excess enamel is drained from the cavity. The cavity is latter filled with the melted plastic material.

In general, according to still another aspect, the process features the previously-described device and similarly includes substantially filling the cavity with the liquid enamel. The process differs in that the cavity is subsequently enlarged, by running movable elements or slides from the form in specific implementations. Then, the space that is thus created is filled with the melted plastic material. This can happen two ways: 1) a fluid can be introduced into the cavity during the step of enlarging and this fluid vented when filling the cavity with the melted plastic material; or 2) simultaneously with enlarging the capacity of the cavity, it can be filled with the melted plastic material.

The invention now makes it possible to produce enameled plastic molded parts in a simpler and therefore more economical manner. By using the inventive process, it is also possible to process enamels which exist only as liquids and not in plasticizable granulate form.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without the departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
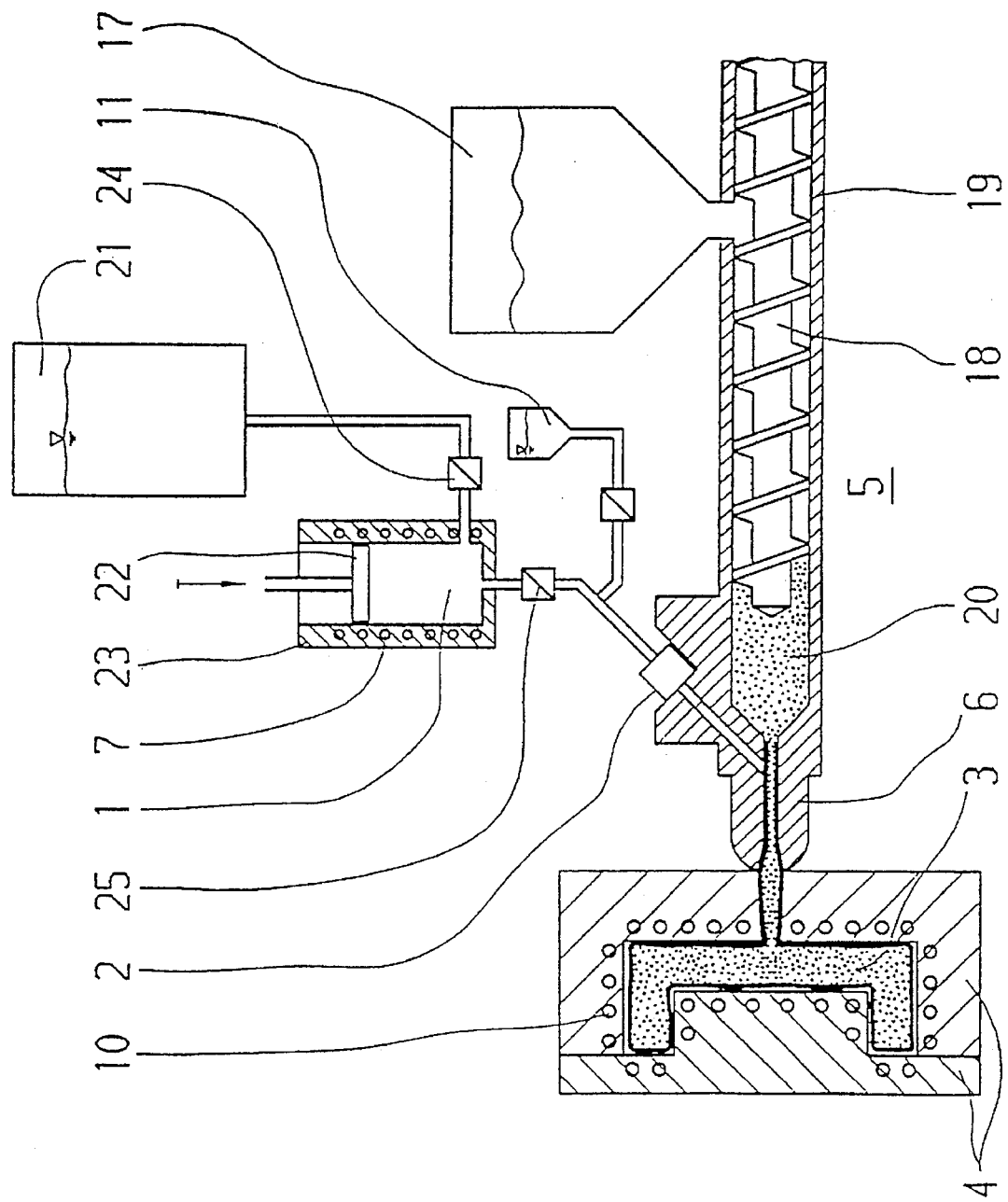
FIG. 1 schematically shows an injection molding device according to the invention.

Turning now to the drawings, an injection molding device, which is constructed according to the principles of the present invention, is illustrated in FIG. 1. Specifically, a plasticizing screw 18 rotates in the injection unit 5. This action causes plasticization of plastic granulate, plastic powder or plastic grit that reaches the screw cylinder 19 from the filling funnel 17. While this is the typical procedure for processing thermoplastics, the inventive process analogously applies also to the processing of duro-plastics and elastomers. Plastic melt, situated in the screw antechamber 20, is driven out, by means of an axial motion imparted by the screw 18, via the plastic-injection die 6, into the cavity 3 of the closed injection molding tool or form 4. But first, liquid enamel situated in an enamel container 21 is injected into the flow path of the plastic melt—that is in the region between the screw antechamber 20 and the actual cavity 3. For this purpose, it passes through a line from the enamel container 21 into the enamel-injection apparatus 1.

The plunger 22 is initially situated at the lower end of the cylinder 23. The valve 24 is opened, and the plunger 22 is moved upward. This is done in order to meter the appropriate amount of enamel to be injected, up to a defined stroke. Then the valve 24 is closed and valve 25 is opened. By lowering the plunger 22 (in the direction of the arrow), the liquid enamel is pressed into the enamel-injection die 2. In the present embodiment, the enamel in the region of the plastic-injection die 6 moves into the flow path of the melt, where it encases the plastic melt that is driven out from the screw antechamber 20.

The plastic—encased in enamel—is usually injected without further additives. However, it is also possible to add to the plastic, before it is injected, a propellent in chemical or physical form, which causes the plastic to foam. The propellent reliably prevents sink marks even in the case of thick-walled molded parts.

In order to make the production process economical, care must be taken that the production time is as brief as possible. Rapid hardening of the injected enamel consequently is desirable. One way to achieve this is to heat the metered quantity of enamel, while it is situated in the cylinder 23 and before it is injected into the cavity, by means of heating elements 7. The tempering capability of the enamel-injection apparatus has the advantage that the reaction can be markedly accelerated by tempering or heating the enamel. This is especially true for two-component enamels and for enamels which react over time and for which this reaction time can be accelerated with increased temperature.

When processing duro-plastics, the process can be implemented very easily, since a large temperature gradient prevails between the tool temperature and the ambient temperature, and furthermore, the tools are hotter than the screw cylinders. This markedly speeds up the reaction process of the injected enamel.

The hardening process in the injection mold 4 can also be accelerated by briefly heating the mold by means of tempering elements 10. Another possibility for rapidly hardening of the enamel is to add a reaction accelerator 11 to the enamel while it is being injected into the cavity.

Figure 2:
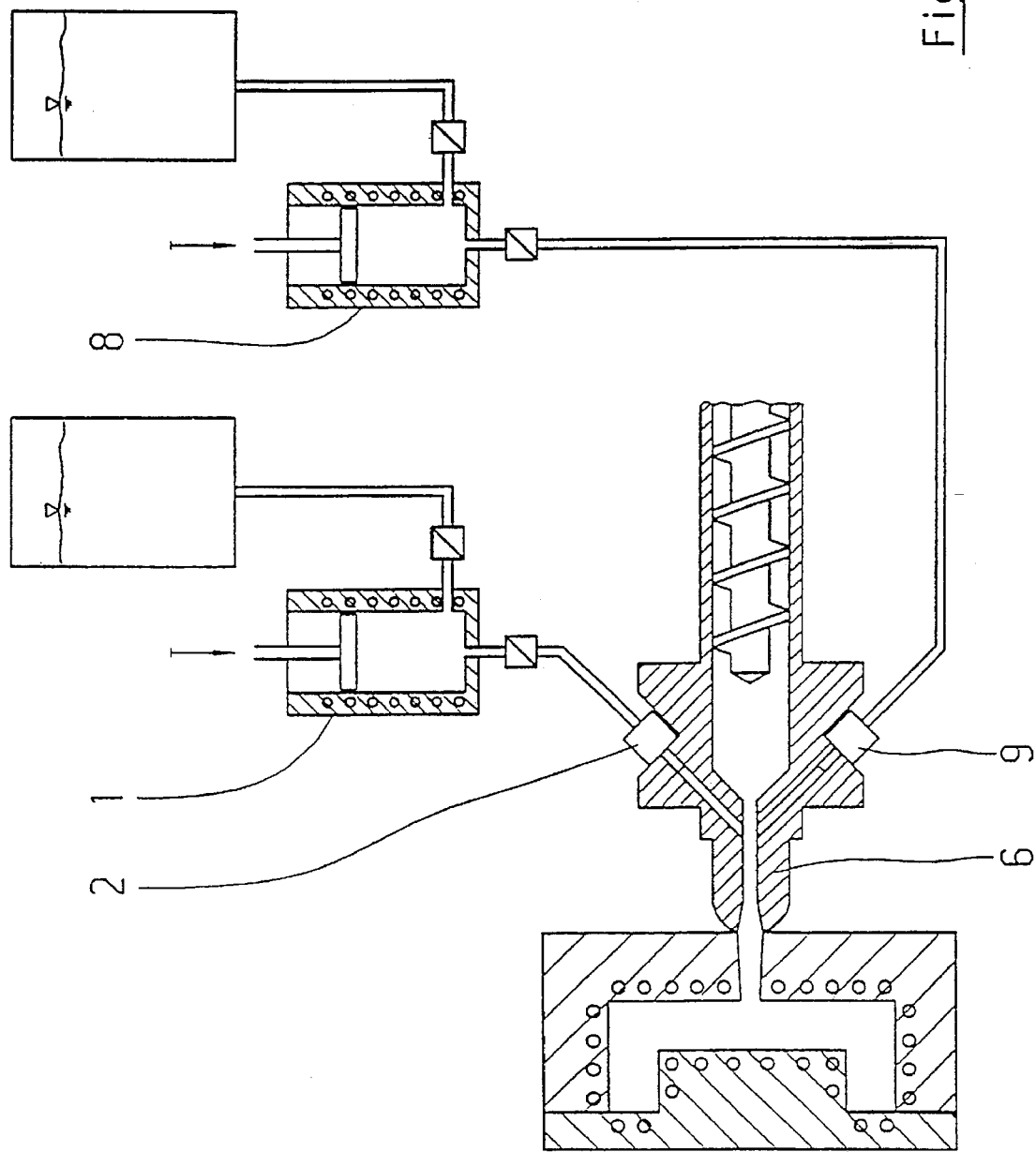
FIG. 2 schematically shows an inventive device for processing a multi-component enamel.

FIG. 2 shows the inventive embodiment when a two-component enamel is to be used for coating the plastic object. Two enamel-injection apparatuses 1 and 8 are now provided, which conduct the enamel to the enamel-injection dies 2 and 9. Through these dies, the two components of the enamel reach the flow path of the melt and are thoroughly mixed.

Figure 3:
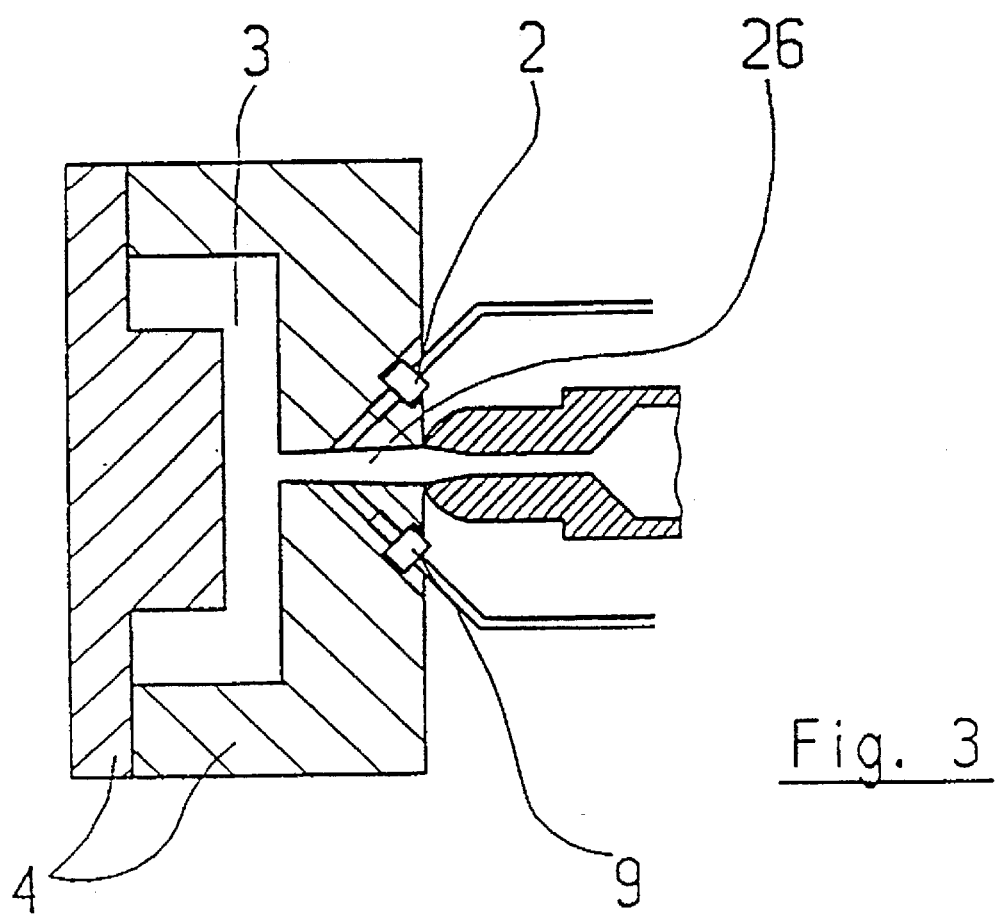
FIG. 3 schematically shows the injection molding from including the injection die for the enamel and the plastic melt.

While FIG. 2 shows the case where the enamel-injection dies 2 and 9—just as in FIG. 1—terminate in the plastic-injection die 6, the invention also provides for the possibility that the enamel-injection die is situated at a location different from that of the plastic-injection die, in the region of the melt flow path. FIG. 3 shows the case—here again when a two-component enamel is being used—where the enamel-injection dies 2 and 9 terminate directly in the runner 26. Here, too, the two enamel components are thoroughly mixed before they, together with the melt which they encase, are introduced into the cavity 3 of the injection molding tool 4.

Figure 4:
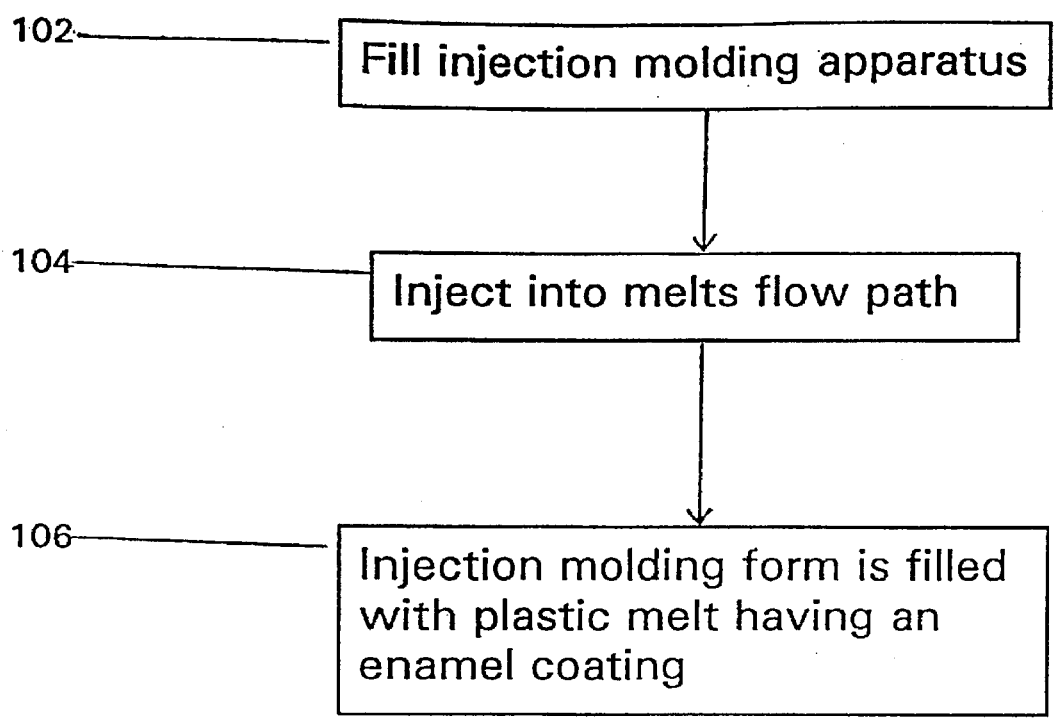
FIG. 4 is a flow diagram illustrating a first embodiment of the inventive injection molding process.

FIG. 4 is a flow diagram illustrating a first embodiment of an injection molding process using the device of FIGS. 1–3. The process begins by first filling the injection molding apparatus 1 with enamel from container 21 in step 102. Then, the liquid enamel is injected into the flow path of the liquid plastic melt as, for example, into the runner 26 or the plastic-injection die 6 in step 104 by the action of the plunger 22. This runner or plastic injection die is upstream in the plastic's flow path from the cavity of the injection molding form 4. The plastic melt is therefore encased by the liquid enamel as it progresses through either of the runner 26 or plastic injection die 6 on the path to the injection molding tool or form 4. As a result, the liquid plastic melt that fills the injection molding form 4 is also encased in enamel. In the filled form, the enamel is located in a layer between the inner surface of the injection molding form 4 and an outer surface of the plastic melt.

Figure 5:
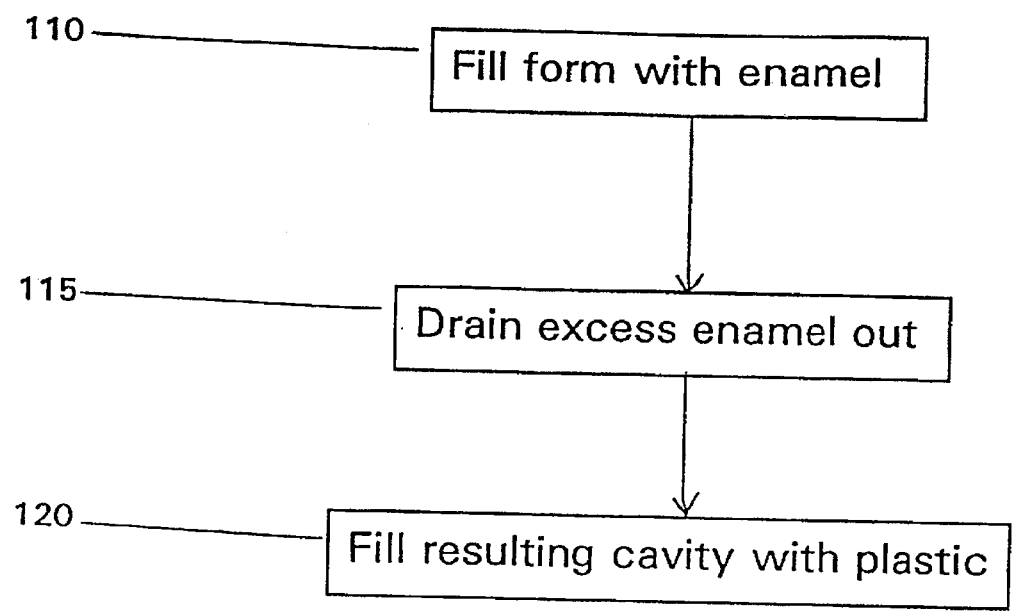
FIG. 5 shows a second embodiment of the inventive process.

FIG. 5 illustrates a second embodiment of the injection molding process. The cavity of the form 4 is first volumetrically filled completely with the liquid enamel in step 110. This includes first filling the enamel injection molding apparatus 1 with enamel from the enamel container 21. Then, the liquid enamel is injected into the form 4 by the action of the plunger 22 which pushes the enamel through the enamel injection die 2 and the plastic injection die 6. All walls of the cavity 3 which are involved in the molding process are thus reliably wetted with enamel. Then, a predetermined volume of enamel is drained from the cavity, so that a hollow space forms in the cavity 3 (step 115). For example, enamel can drain out through an opening at the lowest point of the form 4, until the cavity 3 is essentially empty. Only then is a melted plastic material injected into the cavity by the injection unit 5 by the turning action of the plasticizer screw in the cylinder 19 (step 120).

According to a third embodiment of the inventive process, the volume of the cavity 3 is enlarged to create the space for the plastic, rather than draining the plastic from the form, see step 115 above. Specifically, as in step 110 described above relative to the first embodiment, the form 4 is filled with liquid enamel. Then, movable elements (slides), known for this purpose, are run out of the cavity 3 (step 125). This creates the desired shape of the work piece that is going to be produced while, at the same time, enlarging the volume of the cavity 3. Simultaneously, i.e, as the cavity 3 is being enlarged, a fluid is introduced (step 130); gas is especially used for this purpose. This forms a fluid or gas filled space in the interior of the cavity 3, which is under pressure and is surrounded by liquid enamel. The pressure of the fluid here presses the enamel against the walls of the cavity. If the gas pressure is appropriately chosen, the effect of gravity on the enamel is of minor significance. Melted plastic material is then introduced by the injection unit 5 through the plastic-injection die 6 into the cavity 3 (step 140). The fluid preferably is drained from the cavity (3) at the same time. Thus, the hollow space situated in the interior of the cavity (3) is essentially filled up with plastic.

Figure 6:
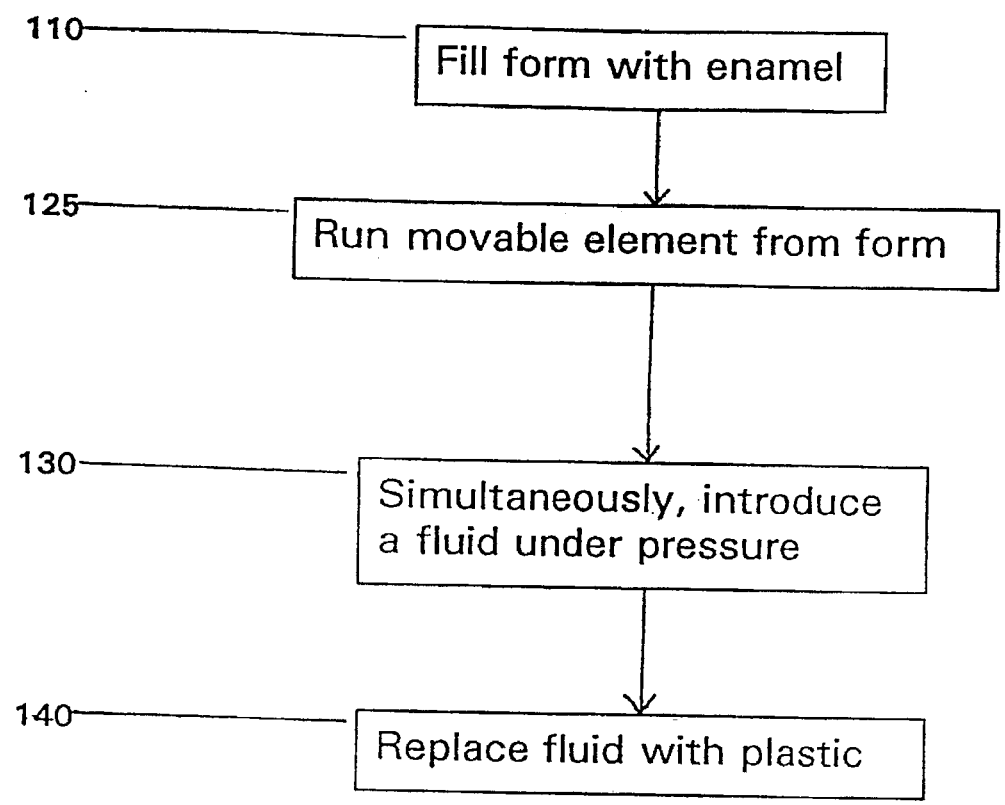
FIG. 6 shows a third embodiment of the inventive process.
Figure 7:
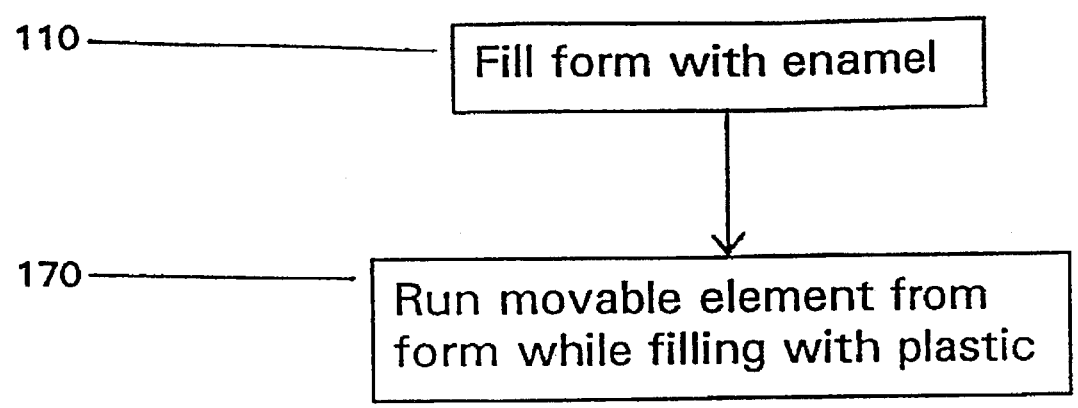
FIG. 7 shows a fourth embodiment of the inventive process.

It is also possible to omit the introduction of gas into the cavity 3 according to a fourth embodiment, FIG. 6. In this case, after the—as yet not enlarged—cavity is filled volumetrically with enamel, the melt is injected while the slide is run out at the same time (step 170). The hollow space created in the interior of the cavity by the enlargement of volume is then directly filled up with melt.

According to a further development of the invention, a plunger injection unit is used as the enamel-injection apparatus 1. Alternatively, a pump, especially a gear pump, can be used as the enamel-injection apparatus.

So that the enamel will be processed better, the enamel advantageously can be heated to a defined temperature before it is injected. This can be done especially through the enamel-injection apparatus 1.

For optimal processing, it can furthermore be necessary that the enamel and the plastic material that are going to be injected have a similar viscosity. The inventive process naturally is also appropriate in the case that two- or multi-component enamels are to be used, for which the hardening process does not begin until the various components are mixed. For this case, two or more different enamel-injection apparatuses 1, 8, FIG. 2, inject enamel through two or more different enamel-injection dies 2, 9, with the components mixing only downstream of the enamel-injection dies 2, 9.

Depending on the specific properties of the liquid enamel that is being processed, it may be advantageous, for the purpose of hardening the enamel, that the temperature of the injection molding tool 4 be increased, preferably briefly, by suitable tempering elements 10. Devices which make it possible to raise the tool temperature briefly are known under the designation "Variotherm". According to a further characteristic of the invention, the temperature of the form-giving surfaces of the injection molding tool 4 can be raised directly before the tool is closed and/or before the enamel is injected, by means of radiation, induction, or in similar fashion.

It can be especially advantageous to produce a plastic object with enamel, which is hollow inside in order to save weight or for other reasons. The technology which is appropriate for this case is known as the inner-gas-pressure process; for this purpose, according to a further development of the process, after the melted plastic material, encased in enamel, has been introduced into the cavity 3, a fluid, preferably a gas, is introduced into the still liquid part of the plastic.

To speed up the injection molding process, it is advantageous to add a reaction accelerator 11 to the enamel that is being injected, immediately before it is injected. The reaction accelerator speeds up the hardening of the enamel.

Furthermore, the plastic being injected can be a moldable plastic.

So that the work piece can be removed from the mold more easily at the end of the injection molding process, it can furthermore be appropriate before introducing the plastic material, encased in enamel, or before introducing the enamel into the cavity 3 of the injection molding tool 4, to provide the form-giving inner surfaces of the cavity 3 with a means, e.g. a silicone solution, which will facilitate the subsequent removal of the object from the mold and from the injection molding tool 4.

With the solution variant that has been presented as an alternative, it may make sense to apply pressure for a predetermined time to the cavity that has first been completely filled up with enamel. This can improve the adhesion of the enamel to the wall. The cavity is volumetrically filled with enamel preferably "from the bottom", that is contrary to the direction of gravity.

While this invention has been particularly shown and described with references to preferred embodiments thereof, it will be understood by those skilled in the art that various changes in form and details may be made therein without departing from the spirit and scope of the invention as defined by the appended claims.

We claim:

1. A process for injection molding objects having at least two different layers with an injection molding device including an injection molding tool having a cavity serving as a form for the objects, two or more different enamel-injection apparatuses for injecting a liquid enamel into the cavity of the injection molding tool through two or more different enamel-injection dies, and a plastic injection unit for introducing a melted plastic material into the cavity of the injection molding tool through a plastic-injection die, the process comprising:

injecting the liquid enamel into a flow path of the melted plastic material in a region upstream of the cavity of the injection molding tool;

subsequently injecting the melted plastic into the region so that the melted plastic material is essentially encapsulated by liquid enamel; and distributing the melted plastic, which is encapsulated by the enamel, in the cavity of the injection molding tool;

wherein the injected liquid enamel is a two- or multi-component enamel; and wherein the liquid enamel components are injected from the two or more different enamel-injection apparatuses through the two or more different enamel-injection dies, the components only mixing downstream of the enamel injection dies.

2. A process as described in claim 1, wherein the enamel-injection apparatuses comprise at least one plunger injection unit.

3. A process as described in claim 1, wherein the enamel-injection apparatuses comprise at least one gear pump.

4. A process as described in claim 1, further comprising heating the liquid enamel to a defined temperature prior to injection into the cavity.

5. A process as described in claim 1, wherein the liquid enamel being injected and the plastic material have a similar viscosity.

6. A process as described in claim 1, wherein the temperature of the injection molding tool is increased by tempering elements to harden the liquid enamel.

7. A process as described in claim 1, further comprising introducing a fluid into a liquid part of the plastic material in the injection molding tool.

8. A process as described in claim 1, further comprising adding a reaction accelerator to speed the hardening of the liquid enamel before injection.

9. A process as described in claim 1, further comprising foaming the melted plastic material introduced into the cavity.

10. A process as described in claim 1, further comprising coating the injection molding tool to facilitate removal of the objects.

11. A process as described in claim 1, further comprising holding the cavity of the injection molding tool under pressure for a defined time after injection of the liquid enamel and before introducing the melted plastic material.

12. A process as described in claim 1, further comprising draining a predetermined volume of the liquid enamel from the cavity prior to filling the cavity of the injection molding tool with the melted plastic material.

13. A process as described in claim 1, further comprising:
    enlarging a capacity of the cavity; and
    filling the cavity of the injection molding tool with the melted plastic material in space created by the enlargement of the cavity.

14. A process for injection molding objects having at least two different layers with an injection molding device including an injection molding tool having a cavity serving as a form for the objects, at least one enamel-injection apparatus for injecting a liquid enamel into the cavity of the injection molding tool through at least one enamel-injection die, and a plastic injection unit for introducing a melted plastic material into the cavity of the injection molding tool through a plastic-injection die, the process comprising:
    substantially filling the cavity of the injection molding tool with the liquid enamel;
    draining a predetermined volume of the liquid enamel from the cavity; and
    filling the cavity of the injection molding tool with the melted plastic material.

15. A process for injection molding objects having at least two different layers with an injection molding device including an injection molding tool having a cavity serving as a form for the objects, at least one enamel-injection apparatus for injecting a liquid enamel into the cavity of the injection molding tool through at least one enamel-injection die, and a plastic injection unit for introducing a melted plastic material into the cavity of the injection molding tool through a plastic-injection die, the process comprising:
    substantially filling the cavity of the injection molding tool with the liquid enamel;
    enlarging a capacity of the cavity; and
    filling the cavity of the injection molding tool with the melted plastic material in the space created by the enlargement of the cavity.

16. A process as described in claim 15, further comprising:
    introducing a fluid into the cavity during the step of enlarging the capacity of the cavity; and
    venting the fluid while filling the cavity with the melted plastic material.

17. A process as described in claim 16, further comprising simultaneously enlarging the capacity of the cavity and filling the cavity with the melted plastic material to fill the space created by the enlargement.

18. A process for injection molding objects having at least two different layers with an injection molding device including an injection molding tool having a cavity serving as a form for the objects, at least two enamel-injection apparatuses for separately injecting at least two components of an enamel into the cavity of the injection molding tool through at least two enamel-component-injection dies, and a plastic injection unit for introducing a melted plastic material into the cavity of the injection molding tool through a plastic-injection die, the process comprising:
    injecting the components of the enamel into a flow path of the melted plastic material in a region upstream of the cavity of the injection molding tool;
    enabling the components of the enamel to mix with each other;
    subsequently injecting the melted plastic into the region so that the melted plastic material is essentially encapsulated by the mixed enamel; and
    distributing the melted plastic, which is encapsulated by the mixed enamel, in the cavity of the injection molding tool.

19. A process as described in claim 18, wherein the at least two enamel-component-injection dies terminate in a runner of the injection molding tool.

20. A process as described in claim 18, wherein the enamel-injection apparatuses each comprise a plunger injection unit for each component of the enamel.

21. A process as described in claim 18, further comprising introducing a fluid into a liquid part of the plastic material in the injection molding tool.

22. A process as described in claim 18, further comprising foaming the melted plastic material introduced into the cavity.

23. A process as described in claim 18, further comprising holding the cavity of the injection molding tool under pressure for a defined time after injection of the mixed enamel and before introducing the melted plastic material.

24. A process as described in claim 18, further comprising draining a predetermined volume of the mixed enamel from the cavity prior to filling the cavity of the injection molding tool with the melted plastic material.

25. A process as described in claim 18, further comprising:
    enlarging a capacity of the cavity; and
    filling the cavity of the injection molding tool with the melted plastic material in space created by the enlargement of the cavity.

* * * * *